US008708184B2

(12) United States Patent
Thurlow

(10) Patent No.: US 8,708,184 B2
(45) Date of Patent: Apr. 29, 2014

(54) FOOD CONTAINER APPARATUS AND METHOD OF USING SAME

(75) Inventor: Heida L. Thurlow, Houston, TX (US)

(73) Assignee: Lentrade, Inc., Houston, TX (US)

( * ) Notice: Subject to any disclaimer, the term of this patent is extended or adjusted under 35 U.S.C. 154(b) by 339 days.

(21) Appl. No.: 12/368,063

(22) Filed: Feb. 9, 2009

(65) Prior Publication Data

US 2010/0200075 A1  Aug. 12, 2010

(51) Int. Cl.
*A47J 27/00* (2006.01)
*A47J 36/00* (2006.01)
*A47J 37/01* (2006.01)
*B65D 43/04* (2006.01)
*B65D 43/08* (2006.01)
*B65D 51/16* (2006.01)

(52) U.S. Cl.
USPC ............. 220/366.1; 220/573.1; 220/800; 220/804; 220/806; 215/307; 215/310

(58) Field of Classification Search
USPC ........... 220/573.1, 366.1, 806, 228, 804, 373, 220/772, 803, 309.2, 800, 722; 215/307, 215/310
See application file for complete search history.

(56) References Cited

U.S. PATENT DOCUMENTS

| | | | | |
|---|---|---|---|---|
| 4,512,497 A | * | 4/1985 | Grusin | 220/369 |
| 5,597,088 A | * | 1/1997 | Fingerle et al. | 220/662 |
| 6,164,484 A | * | 12/2000 | Fiore et al. | 220/521 |
| 6,318,556 B1 | * | 11/2001 | Lambert | 206/509 |
| 6,491,176 B1 | * | 12/2002 | Schollenberger et al. | 215/307 |
| 7,086,552 B2 | * | 8/2006 | Zepter | 220/573.4 |

OTHER PUBLICATIONS

Tupperware, "Vent N' Serve Small Round Set", http://order.tupperware.com/coe/app/tup_show_item.show_detail?tv_item_category, entire site, Jun. 5, 2009, 1 page.
Chantal. "Bakeware", http://www.chantal.com/bakeware/, Jun. 5, 2009, 2 pages.
Google, "Round Covered Casserole—Google Image Search", http://images.google.com/images?hl=en&q=Round%20Covered%20Casserole&um=1&ie=, Jun. 5, 2009, 2 pages.

(Continued)

*Primary Examiner* — Fenn Mathew
*Assistant Examiner* — Andrew T Kirsch
(74) *Attorney, Agent, or Firm* — Streets & Steele; Patrick K. Steele; Jeffrey L. Streets

(57) ABSTRACT

A food container system and method of using same is provided for heating, storing or cooling food placed within a container. The container system facilitates heating of food without dehydration of the food, and it permits cooling of the food, such as, for example, cooling in a refrigerator or cooling at room temperature after removal from a heating oven or microwave, without vapor lock preventing or making difficult the removal of a lid from a container in which the food is heated or cooled. The system comprises, in one aspect, a ceramic lid and a ceramic container to receive the lid, and a seal having a channel there through and disposed intermediate the ceramic lid and the ceramic container. In one aspect, the seal may comprise a heat-resistant silicon material. In one aspect, the same container system may be used, for example, to heat a food placed in the container, to serve the food at a dining table, and to store the food, or the remaining unconsumed portion of the food, in a refrigerator for later reheating and consumption.

9 Claims, 4 Drawing Sheets

(56) References Cited

OTHER PUBLICATIONS

Google, "Round Covered Casserole—Google Image Search", http://images.google.com/images?hl=en&um=1&sa=1&q=Round+Covered+Casserole+ce. Jun. 5, 2009. 2 pages.

Chantal Online / Shop and Buy Cookware Teakettles, Bakeware, Fondue, Mugs and More "Chantal Online", http://www.chantal.com/home.php. Jun. 8, 2009, 2 pages.

* cited by examiner

FOOD CONTAINER APPARATUS AND METHOD OF USING SAME

The present invention relates to a food container system usable for storing, heating and/or for serving food for human consumption, and to a method of using the food container system.

BACKGROUND

A variety of different products are used by consumers for storing, heating and for serving food for human consumption. Containers are used for cooking, storing and refrigerating, and for serving food. Each material offers certain advantages and disadvantages, depending on the application. For example, plastic food containers provide superior sealing for storing and preserving food in, for example, a refrigerator because plastic is suitable for refrigeration and can be easily molded with tongue-in-groove sealing elements for sealably coupling a lid to a container, such as in Tupperware®. Although some plastics are safe for washing in dishwashers, some are damaged by exposure to heat. Plastics may stain from exposure to certain foods, especially when foods are heated while in the plastic container. Also, plastics are generally disfavored for use as serving containers for the dining table due to a very casual appearance and feel. Recently, consumer concerns regarding the presence of Bisphenol A ("BPA") used in hard plastics, and with the environmental impact of plastics, cause plastics to be less favored for food containers.

Metal containers, such as pots and pans, offer superior flame resistance and can be used to heat food on a stove top or in a conventional oven. Metals are dishwasher safe and are highly resistant to thermal shock. However, like plastics, metals are generally disfavored for use as serving containers for the dining table because of their metallic appearance. Metal containers are excellent conductors of heat, and a metal serving container acts as an unwanted radiator that rapidly cools the food served from the container at the table. Also, metals are highly incompatible with microwave ovens. Additionally, due to their tendency to rust or to react with other elements, metals may impart an undesirable taste to some foods. This same reactivity means that metals offer generally poor resistance to staining when brought into contact with certain foods.

Glass is another material that offers resistance to staining and is dishwasher safe. Some glass materials, such as Pyrex®, may also be used in conventional ovens and in microwave ovens. However, glass may shatter if subjected to temperature extremes, and glass is generally disfavored for use as serving containers for the dining table.

Fired ceramics are particularly favorable materials for use with foods because fired ceramics are generally microwave compatible, dishwasher safe, and highly stain resistant. Ceramics are particularly favored for use on dining tables because they can be painted and coated prior to being fired, and surface coatings imparted to ceramics are very attractive for use on the dining table, and are both washable and chip-resistant. Additionally, ceramics are generally poor conductors of heat, making them ideal for use as serving containers on a dining table. These characteristics make ceramic almost ideal for multi-purpose use; that is, fired ceramics can be used to store, heat and serve food, thereby eliminating the necessity for multiple containers for a single food. However, the problem with ceramics is that they do not provide for effective sealing to preserve the flavor and moisture in foods stored in the refrigerator or heated in the microwave.

A problem that is encountered in the use of fired ceramic containers relates to shrinkage. Articles made of fired ceramic materials are generally made from a clay material that can be shaped to form, for example, a container or a lid. In order to impart rigidity and strength to the material, it is fired in an oven for an amount of time needed to set the material. In the course of firing the ceramic material, the container or lid non-uniformly shrinks approximately 11 to 14%, and physical and dimensional irregularities commonly result from the shrinkage caused by firing. For example, a container may be fashioned from clay, and the container may be almost perfectly round. But when the container is fired in an oven, the size of the container is non-uniformly reduced, and the resulting fired ceramic container will not be perfectly round, and/or the cooled and hardened fired ceramic container may have undulations, deviations or imperfections. These imperfections may also be present in a fired ceramic lid that is made for the fired ceramic container. While these imperfections are thought by many to add an aesthetic quality to the resulting product, the non-uniform shrinkage makes it difficult to achieve a uniform clearance between mating surfaces, such as the engaging surface of the lid and the engaging surface of the container. For this reason, effective sealing is very difficult to achieve with fired ceramics.

What is needed is a ceramic container system for sealably storing foods so that the same container system can be used for storing, heating and serving food. Preferably, a container, a lid and a seal will all be microwavable and dishwasher safe. Preferably, the seal can be adapted to release pressure from the container system that may result from heating of foods within the container in, for example, a conventional oven or a microwave oven. Additionally, the container system should allow ambient air to enter the container system to prevent unwanted vapor lock. The seal should also be compatible with non-uniform mating surfaces commonly encountered in cookware fashioned from ceramic materials.

SUMMARY OF THE PRESENT INVENTION

The present invention satisfies one or more of the above-stated needs. In one embodiment, the present invention provides a fired ceramic container system having a lid engaging surface to sealably engage a container engaging surface of a ceramic lid when the lid is received in a seated engagement with the container. A seal, which may be a heat-resistant, flexible silicon seal, may be disposed intermediate the lid engaging surface of the container and the container engaging surface of the lid to substantially seal the interior of the container system from the atmosphere surrounding the container system. The seal may comprise one or more channels to facilitate movement of a volume of gas across the channel of the seal. The channel in the seal prevents excessive pressure from building up when foods are heated within the container system, and also prevents of an excessive vacuum when hot gases within the interior of the container cool when, for example, the container system is removed from an oven and allowed to cool.

In another embodiment, the seal comprises a plurality of concentric radially protruding and flexible ribs. The protruding ribs protrude from the seal, which may be received onto a protruding lip on at least one of the lid or the container, and flexibly protrude there from to engage and seal against the engaging surface of the other of the lid or container. In another embodiment, the seal may comprise a plurality of channels. Preferably, the seal material is substantially heat-resistant and dishwasher safe, and is generally of a durable material that does not melt when heated or adhere to the ceramic components as a result of heating. The seal is preferably easily removed from and installed on a portion of the lid of the container for easy cleaning.

DETAILED DESCRIPTION

Figure 1:
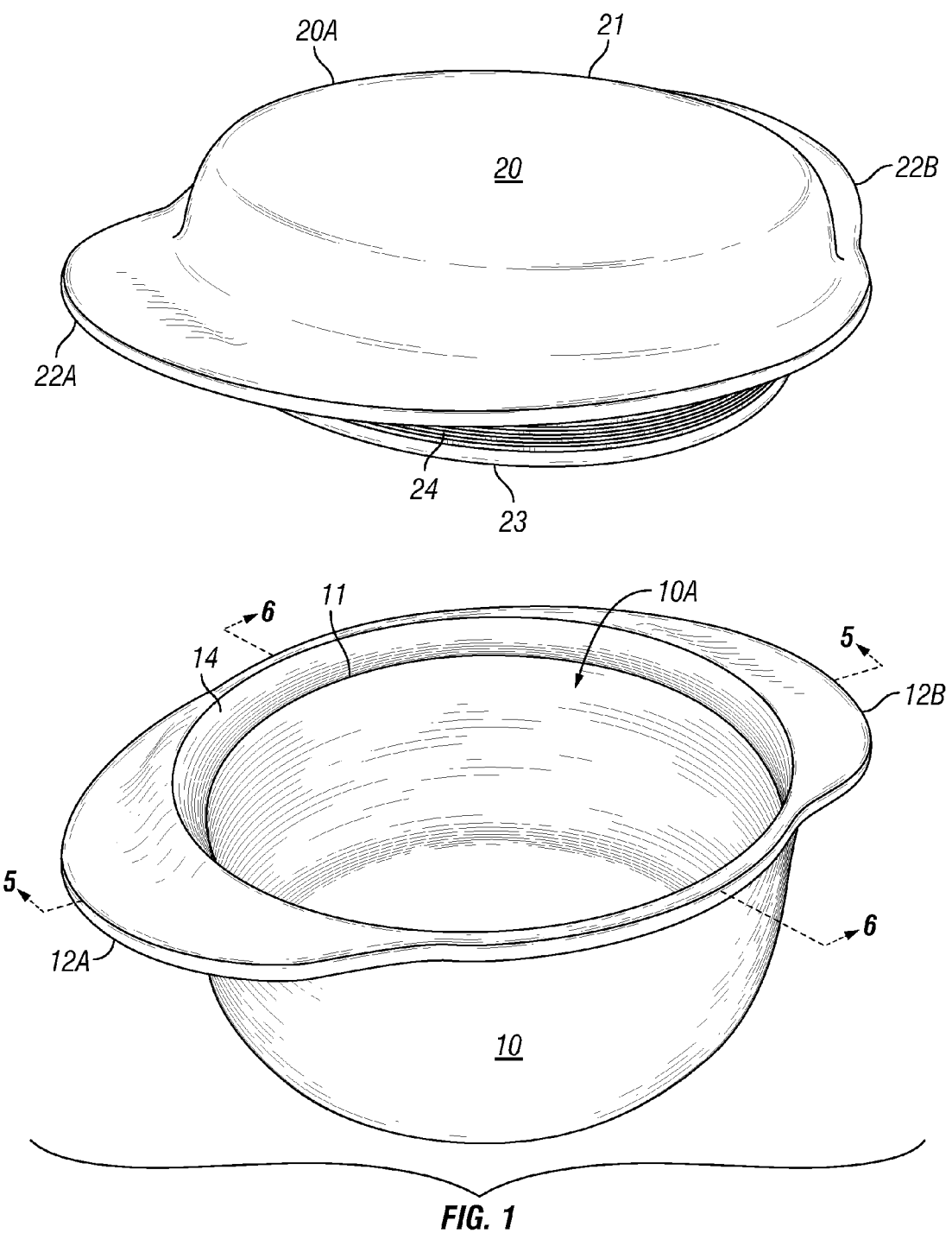
FIG. 1 is a perspective view of one embodiment of a ceramic lid in an aligned and spaced-apart relationship to one embodiment of a ceramic container.

FIG. 1 is a perspective view of one embodiment of a generally circular ceramic lid 20 in an aligned and spaced-apart relationship to one embodiment of a generally circular ceramic container 10. The embodiment of the lid 20 shown in FIG. 1 comprises a first flange 22A generally opposite a second flange 22B, and a raised portion 21 there between having a generally flat surface 20A, the raised portion 21 providing an interior cavity (not shown—see element 20B shown in FIG. 3) within the lid 20. The embodiment of the lid 20 shown in FIG. 1 further comprises a protruding lip 23 to receive a seal 24 thereon.

Figure 6:
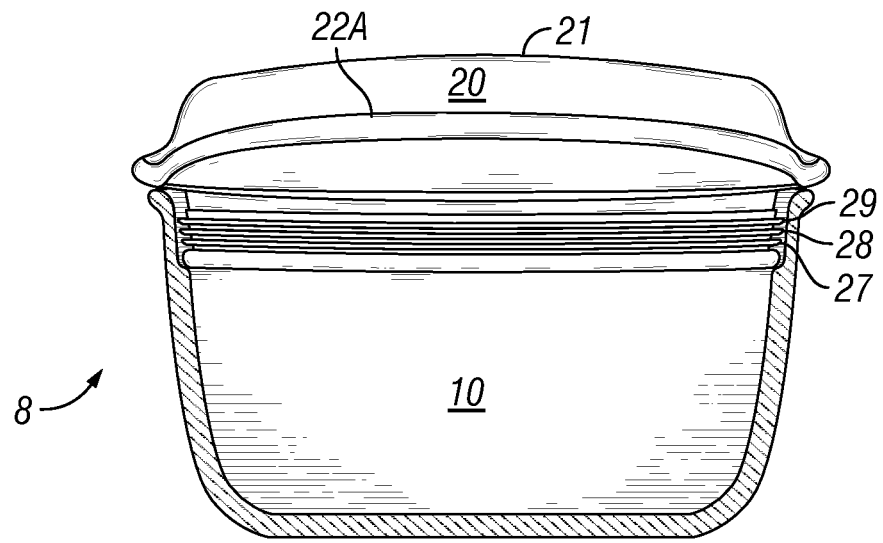
FIG. 6 is an elevation view of the embodiment of the ceramic lid shown in FIG. 1 received and seated into an opening in a cross-section view of an embodiment of the ceramic container shown in FIG. 1.

The embodiment of the container 10 shown in FIG. 1 comprises an interior 10A to receive a food therein through an opening 11. The embodiment of the container 10 shown in FIG. 1 further comprises a generally tapered seat 14 adjacent the opening 11 to receive and support the protruding lip 23 of the lid 20. Food to be stored, heated or cooled within the container 10 is placed within the interior 10A of the container 10 through the opening 11, and can be substantially sealed within the interior 10A of the container 10 by engaging the lid 10, as shown in FIG. 6 discussed below.

Figure 2:
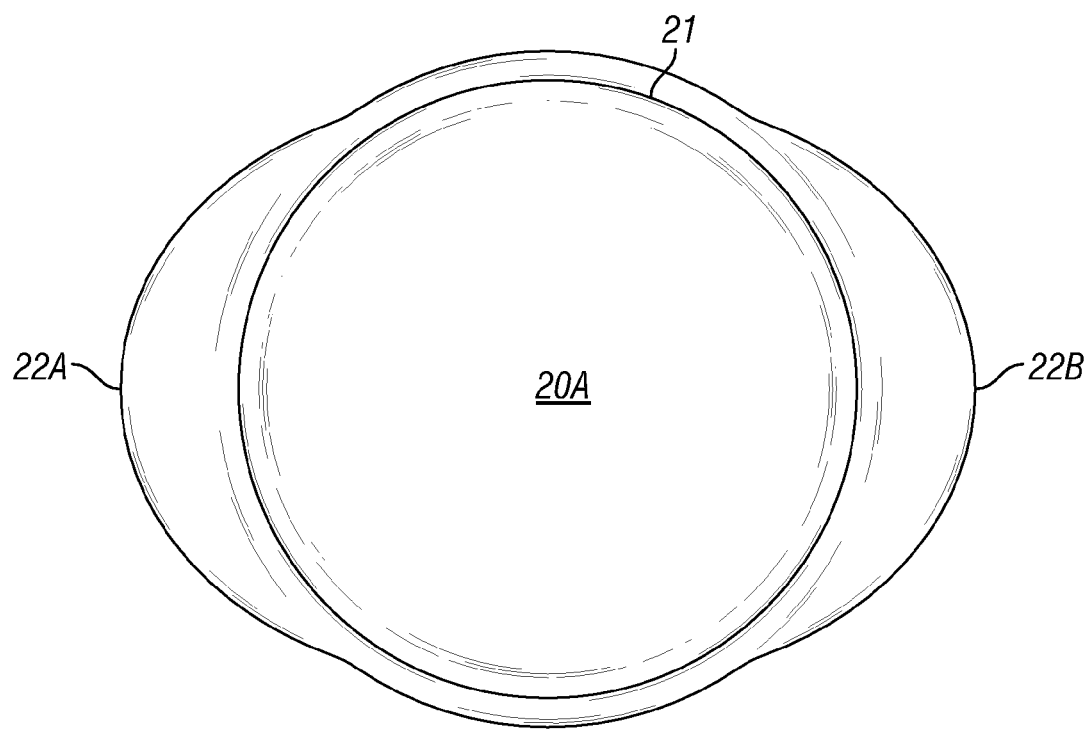
FIG. 2 is a top view of the embodiment of the lid shown in FIG. 1.

FIG. 2 is a top view of the embodiment of the lid 20 that is shown in and discussed in connection with FIG. 1 above. The top view of the lid 20 of FIG. 2 shows the surface 20A intermediate the first flange 22A and the second flange 22B, each flange protruding radially outwardly from the surface 20A of the lid 20. The surface 20A resides atop the raised portion 21. It should be noted that the raised portion 21, flat surface 20A and the flanges 22A and 22B are merely design elements which may add to the overall usefulness of the container 10 and lid 20.

Figure 3:
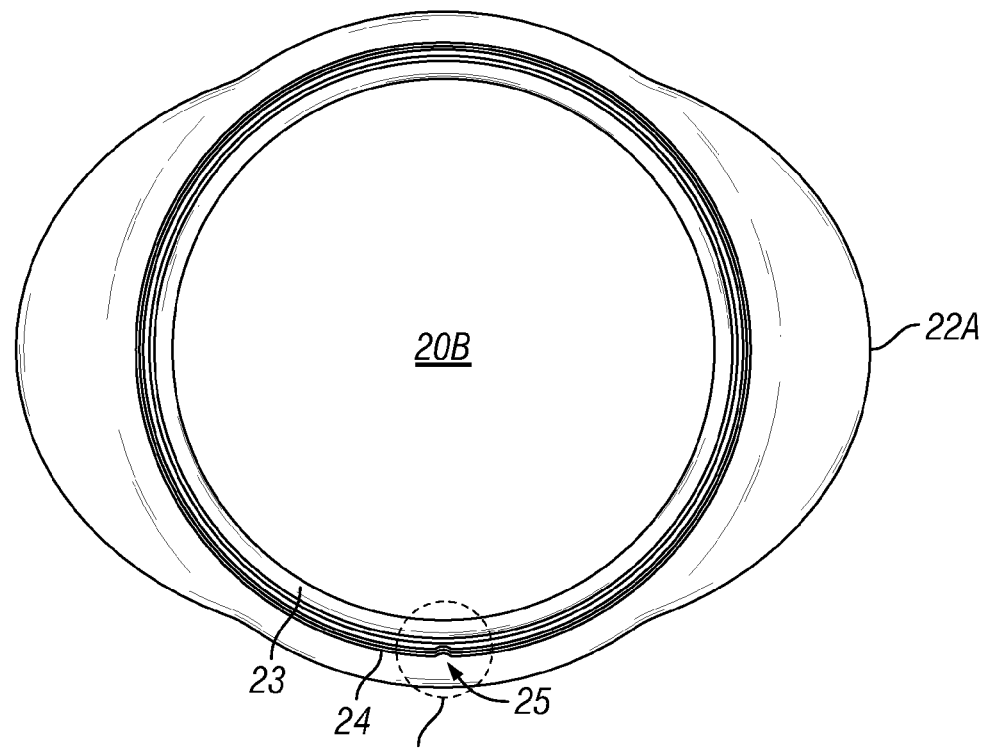
FIG. 3 is a bottom view of the embodiment of the lid of FIG. 1.

FIG. 3 is a bottom view of the embodiment of the lid 20 of FIG. 1 showing the protruding lip 23 intermediate the flanges 22A and 22B, and the interior 20B of the raised portion 21 (not shown in FIG. 3—see FIGS. 1 and 2). Received on the protruding lip 23 is a multi-ribbed heat-resistant seal 24 comprising a channel 25. The channel 25 is discussed in more detail in connection with the enlarged view of FIG. 7. It should be noted that the container 10 and lid 20 function without the raised portion 21 and the interior 20B shown in FIGS. 2 and 3, respectively, but that these features enhance usefulness by providing additional space within the container 20 when the lid 10 is sealably received thereon. Specifically, as some foods tend to splatter during microwave heating, the interior 20A on the lid 20 helps prevent unwanted dripping or running of condensation from the lid 10 upon removal from the seated engagement with the container 20.

Figure 4:
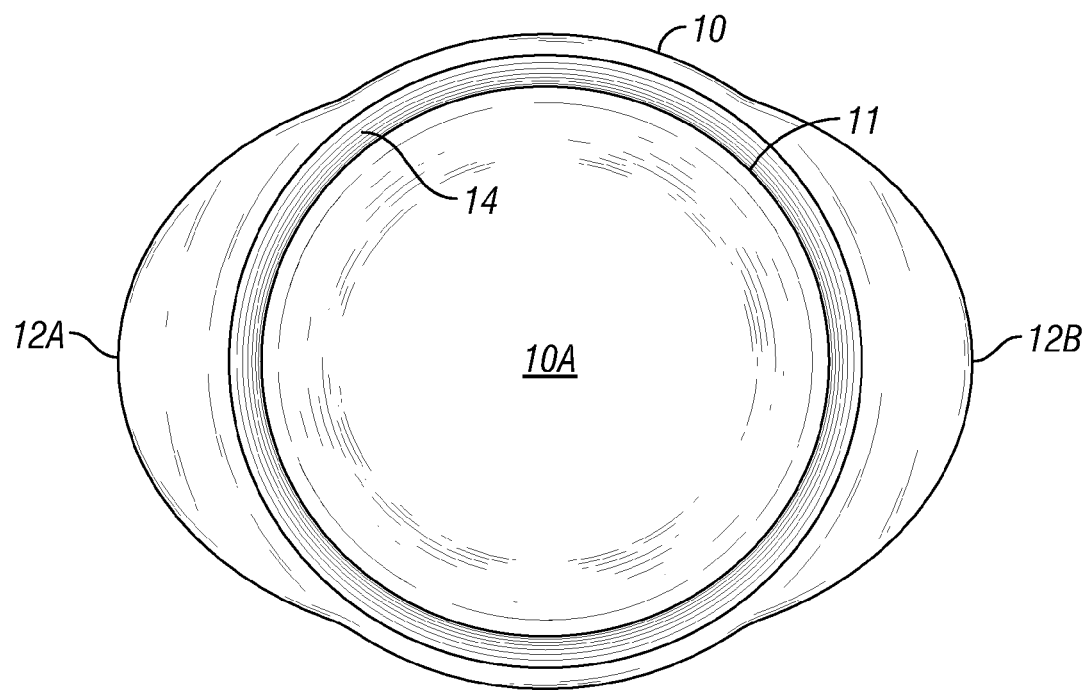
FIG. 4 is a top view of the interior of the embodiment of the container of FIG. 1.

FIG. 4 is a top view of the interior 10A of the embodiment of the container 10 shown in FIG. 1 showing the interior 10A in which foods can be stored, for example, for heating or cooling in an oven or refrigerator. Also shown in FIG. 4 are the flanges 12A and 12B that may be grasped by the user to support the container 10, and opening 11, through which foods may be introduced into the interior 10A, and the tapered seat 14 that generally surrounds the opening 11. The tapered seat 14 is generally formed to engage the seal 24 installed on the protruding lip 23 of the lid 20 (see FIGS. 1 and 3) when the lid 20 is received to close the opening 11.

Figure 5:
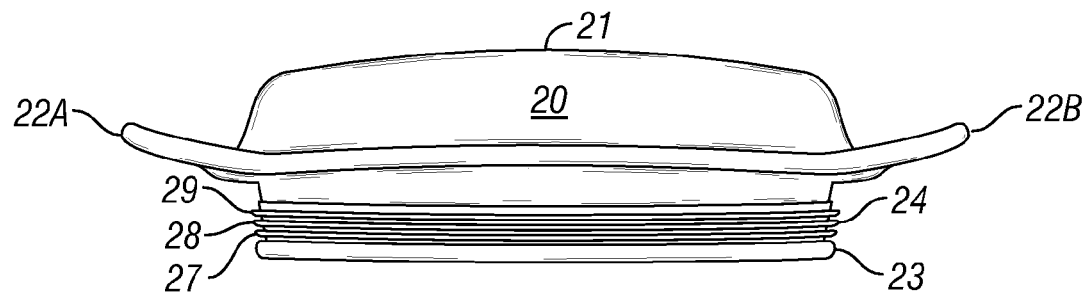
FIG. 5 is an elevation view of the embodiment of the ceramic lid shown in FIG. 1 in an aligned and spaced-apart relationship with a cross-section view of an embodiment of the ceramic container shown in FIG. 1.
Figure 5:
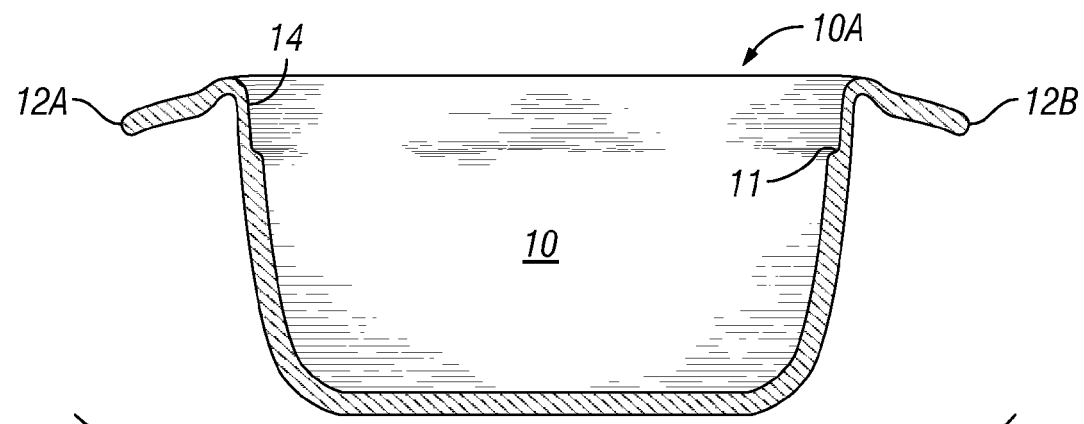

FIG. 5 is an elevation view of the embodiment of the ceramic lid 20 shown in FIG. 1 in an aligned and spaced-apart relationship with a cross-section view of an embodiment of the ceramic container 10 shown in FIG. 1. It should be noted that the seal 24 disposed about the protruding lip 23 of the lid 20 will, when the lid is seated to close the opening 11 of the container 10, engage the tapered seat 14 with protruding ribs 27, 28 and 29 (ribs shown in more detail in FIG. 7) of the seal 24 disposed radially outwardly from the protruding lip 23 to engage the tapered seat 14. It should be noted that the channel 25 in the seal 24 is not visible in FIG. 5 (see FIG. 3).

FIG. 6 is an elevation view of the embodiment of the system 8 comprising the ceramic lid 20 shown in FIG. 1 received and seated to close the opening 11 in a cross-section view of an embodiment of the ceramic container 10 shown in FIG. 1. The seal 24 comprises protruding ribs 27, 28 and 29 which, when the lid 20 is in the seated position shown in FIG. 6, engage the tapered seat 14.

Figure 7:
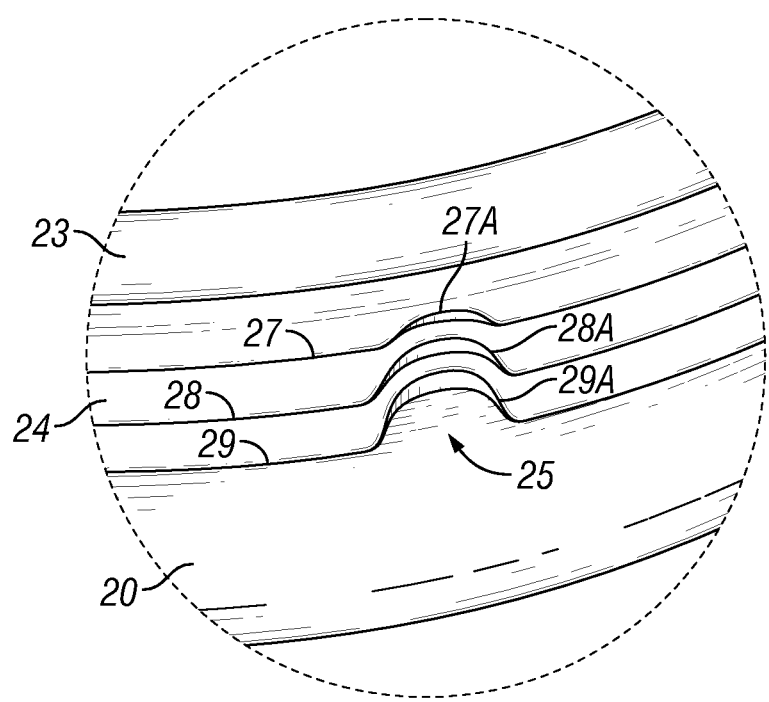
FIG. 7 is an enlarged view of one embodiment of a channel in one embodiment of a seal disposed on the ceramic lid shown in FIG. 3.

FIG. 7 is an enlarged view of one embodiment of a channel 25 in one embodiment of a seal 24 disposed on the ceramic lid 20 shown in FIG. 3. The embodiment of the channel 25 illustrated in FIGS. 1 and 7 comprises a series of notches 27A, 28A and 29A in protruding ribs 27, 28 and 29 of the seal 24. It should be understood that the notches 27A, 28A and 29A in protruding ribs 27, 28 and 29 of the seal 24 do not necessarily have to be in alignment, as shown in FIGS. 3 and 7, or of a generally semicircular cross-section, and may be of any configuration to allow movement of gas across the seal 24 to decrease or eliminate a pressure differential across the seal 24 resulting from heating or cooling of the gas inside the system 8. The movement of gas across the seal 24 through the channel 25 may be increased by, for example, enlarging the channel 25, enlarging the notches 27A, 28A and 29A that make up the channel 25, or by disposing a plurality of channels 25 in the seal 24 to increase gas movement for a given pressure differential. It is preferred that the capacity of the channel 25 to accommodate gas movement across the seal 23 is sufficiently small so that the food stored within the system 8 would not dehydrate during a normal term of storage, for example, in a refrigerator.

It should be understood that the term "container," as used herein, simply means a structure having an interior chamber and an opening. The chamber can receive, through the opening, and contain a food to be stored, heated or cooled, and the chamber can surrender the food through the opening. It should be understood that the term "lid," as used herein, simply means a structure to engage and close the opening of the container. It should be understood that the term "seal," as used herein, simply means a structure that substantially impairs, and does not necessary prevent, the flow of fluid, such as a gas or a liquid, across the interface of the lid and the container when the lid engages the opening of the container. It should be understood that "ceramic," as that term is used herein to describe the material of the container and/or lid, simply means an earthenware, porcelain or brick material made from an inorganic, non-metallic mineral by firing at a high temperature. It should be understood that the term "cooking," as used herein, means heating the food within the container system, whether it be on a stove top, in an oven or in a microwave, and includes, but is not limited to, baking and braising. The term "cookware," as used herein, means an article capable of containing a food for cooking, and should not be limited to an article that is actually used to heat food since an article as described in the claims below may be used, for example, for storing a food in a refrigerator, and the article would still be within the scope of the claims.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

While the foregoing is directed to embodiments of the present invention, other and further embodiments of the invention may be devised without departing from the basic scope thereof, and the scope thereof is determined by the claims that follow.

I claim:

1. A system for use in storing, heating and/or cooling a food comprising:
    a ceramic lid having a generally frustoconical protruding lip thereon forming a seal-receiving member;
    a ceramic container having an interior and an opening with an internal tapered seat to receive the protruding lip of the ceramic lift, and
    an elastomeric seal received on the seal-receiving member of the protruding lip of the ceramic lid and having a plurality of radially outwardly-extending flexible elastomeric ribs to engage the internal tapered seat of the opening of the ceramic container, the seal further having at least one notch in each of the plurality of outwardly-extending flexible ribs to together form at least one channel within the flexible ribs to facilitate movement of a volume of gas between the atmosphere and the interior of the ceramic container;
    wherein a pressure differential arising from pressure within the container, fitted with the lid, that is less than the pressure of the atmosphere surrounding the container will cause a volume of gas to flow from the atmosphere, through the channel within the flexible ribs, and into the container to thereby prevent vapor lock from seizing the lid onto the container.

2. The system of claim 1 wherein the seal comprises one of rubber and silicon.

3. The system of claim 1 wherein the ceramic lid comprises a pair of opposed flanges to facilitate handling of the ceramic lid.

4. The system of claim 3 wherein the ceramic container comprises a pair of opposed flanges to facilitate handling of the ceramic container;
    wherein each of the pair of opposed flanges of the ceramic container forms an acute angle with one of the pair of opposed flanges of the ceramic lid when the protruding lip of the ceramic lid and the seal are received into the opening of the ceramic container; and
    wherein each of the pair of opposed flanges of the ceramic container and the adjacent flange of the ceramic lid may be gripped and squeezed to close the acute angle therebetween to impart an unseating force to the ceramic lid.

5. The system of claim 2 wherein the protruding lip of the ceramic lid is tapered.

6. An article of cookware comprising:
    a ceramic lid having a generally frustoconical protruding lip thereon forming a seal-receiving member;
    a ceramic container having an opening therein to receive the seal-receiving member of the protruding, lip of the ceramic lid, the opening having an internal tapered seat; and
    a seal, comprising a plurality of radially-outwardly extending flexible ribs, each interrupted by at least one notch to together form a channel across the ribs of the seal, the seal received on the seal-receiving member of the protruding lip of the ceramic lid to sealably engage the internal tapered seat of the opening of the ceramic container;
    wherein the channel formed by the notches in the plurality of flexible ribs facilitates the movement of gas from the atmosphere, across the ribs of the seal and into the interior of the ceramic container when the seal-receiving member of the protruding lip of the ceramic lid, and the seal thereon, are received within the internal tapered seat of the opening of the ceramic container.

7. The article of claim 6 wherein the plurality of flexible ribs of the seal comprise one of rubber and silicon.

8. The article of claim 6 wherein the ceramic lid comprises a pair of opposed flanges to facilitate handling of the ceramic lid.

9. The article of claim 8 wherein the ceramic container comprises of a pair of opposed flanges to facilitate handling of the ceramic container;
    wherein each of the pair of opposed flanges of the ceramic container forms an acute angle with one of the pair of opposed flanges of the ceramic lid when the protruding lip of the ceramic lid and the seal are received into the opening of the ceramic container; and
    wherein each of the pair of opposed flanges of the ceramic container and the adjacent flange of the ceramic lid may be gripped and squeezed to close the acute angle therebetween to impart an unseating force to the ceramic lid.

* * * * *